(12) United States Patent
Nakata et al.

(10) Patent No.: US 6,316,862 B1
(45) Date of Patent: Nov. 13, 2001

(54) MOTOR DRIVE APPARATUS HAVING POWER SUPPLY RESTORING FUNCTION

(75) Inventors: Masao Nakata, Toyohashi; Motoya Yamamoto, Hamamatsu; Toshihiro Uchida; Teruhisa Matsushita, both of Toyota, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/533,858

(22) Filed: Mar. 24, 2000

(30) Foreign Application Priority Data

Jul. 9, 1999 (JP) .................................. 11-195740

(51) Int. Cl.[7] .......................... H01L 41/04; H01L 41/08; H01L 41/18
(52) U.S. Cl. ..................... 310/316.02; 318/116; 361/23
(58) Field of Search .................. 310/316.01, 316.02, 310/316.03, 317; 318/116; 361/28, 29, 30, 23

(56) References Cited

U.S. PATENT DOCUMENTS

| | | | |
|---|---|---|---|
| 5,744,897 | * | 4/1998 | Takagi et al. ..................... 310/316 |
| 6,163,100 | * | 12/2000 | Morizaki et al. .................. 310/317 |
| 6,215,223 | * | 4/2001 | Furukoshi et al. ............. 310/316.01 |

* cited by examiner

Primary Examiner—Brian Sircus
Assistant Examiner—Michael C. Zarroli
(74) Attorney, Agent, or Firm—Law Office of David G. Posz

(57) ABSTRACT

In a motor drive apparatus for an ultrasonic motor, a microcomputer checks whether a starter is driven within a predetermined time period from a detection of motor lock, when the motor lock is detected before the detection of a decrease in a battery voltage. The starter drive is stored in its internal memory. The microcomputer checks whether the starter was driven within the predetermined time period, when the battery voltage is restored and the starter drive is completed. The microcomputer drives the ultrasonic motor again if the check result indicates that the starter motor was driven.

15 Claims, 9 Drawing Sheets

MOTOR DRIVE APPARATUS HAVING POWER SUPPLY RESTORING FUNCTION

CROSS REFERENCE TO RELATED APPLICATION

This application relates to and incorporates herein by reference Japanese Patent Application No. 11-195740 filed on Jul. 9, 1999.

BACKGROUND OF THE INVENTION

The present invention relates to a motor drive apparatus for driving motors such as ultrasonic motors.

Ultrasonic motors use ultrasonic vibrations as the driving force. In a progressive wave-type ultrasonic motor, a stator is comprised of an annular elastic body and a piezoelectric body which are attached to each other, and a rotor fixed to a drive shaft is pressured to contact the stator. The piezoelectric body is supplied with drive signals at a fixed frequency and in two phases, that is, in a sine wave and a cosine wave which are 90° different in phase. The piezoelectric body produces mechanical vibrations in response to the two-phase drive signals to cause in the elastic body ultrasonic vibrations (progressive waves) which move in the annular direction along the elastic body. The progressive waves rotate the rotor pressure-contacted with the elastic body.

A drive apparatus which generates the drive signals is comprised of a microcomputer, an oscillator circuit, a switching control circuit, a drive signal generator circuit, a band pass filter and the like. In the drive apparatus, the drive signal generator circuit generates an alternating current (a.c.) voltage of a fixed oscillation frequency of the oscillator circuit. The drive apparatus applies the a.c. voltage to the piezoelectric body to drive the ultrasonic motor.

A rotation sensor is attached to the ultrasonic motor, and generates a rotation pulse signal every predetermined angular rotation of the motor. The microcomputer counts the rotation pulse signal to check whether a control object driven by the ultrasonic motor has reached to a predetermined position or whether the ultrasonic motor is operating normally.

The ultrasonic motor is used, for instance, in a tilting device and a telescopic device of a vehicle steering system. In this system, the d.c. voltage of a vehicle battery (about 12 V) is converted to the a.c. voltage (about 200 Vrms).

When an engine of the vehicle is driven by a starter motor during the operation of the ultrasonic motor, it may occur that the d.c. voltage of the battery cannot be boosted to the a.c. voltage required for the ultrasonic motor because the battery voltage tends to decrease during the engine starting (cranking) operation. Therefore, it is proposed to monitor the battery voltage by the microcomputer. The ultrasonic motor is stopped once when the battery voltage decreases below a predetermined level, and it is driven again after the battery voltage restores to the predetermined level.

For instance, when the battery voltage decreases below less than a predetermined level V1 (for instance, 9 V) at time t1 as shown by (A) in FIG. 9, the microcomputer detects the decrease in the battery voltage at time t2 after a detection delay time period T from time t1 as shown by (B) in FIG. 9. The voltage supply to the ultrasonic motor is stopped in response to the detection of voltage decrease as shown by (D) in FIG. 9. The ultrasonic motor is supplied with the voltage again at time t3, when the battery voltage restores or increases above a predetermined level V2 as shown by (A) in FIG. 9.

Further, the microcomputer calculates rotation speeds of the ultrasonic motor from the rotation pulse signal generated by the rotation sensor. The microcomputer determines that the ultrasonic motor is in the abnormal condition when the calculated rotation speed decreases below a predetermined level. The abnormal condition may be a motor lock or an unstable rotation, which occurs when a foreign matter is jammed in the motor. In this instance, the ultrasonic motor is not driven again even when the battery voltage restores the predetermined level.

When the battery voltage decreases as shown by (A) in FIG. 9, the rotation speed of the motor decreases. If the microcomputer detects the decrease in the voltage prior to the decrease in the rotation speed, the microcomputer fails to detect the abnormal condition as shown by (C) in FIG. 9. As a result, the ultrasonic motor is driven again when the battery voltage restores, even under the condition that the abnormal condition remains.

On the other hand, as shown in FIG. 10, when the microcomputer detects the abnormal condition, motor lock for instance, at time t2 before the detection of the decrease in the battery voltage at time t3 as shown in FIG. 10, the ultrasonic motor cannot be driven again even after the battery voltage restores the predetermined level V2 at time t4.

For the above reasons, it is likely to occur that the ultrasonic motor is disabled to drive the control object to predetermined positions when the starter motor is driven to start the engine during the operation of the ultrasonic motor.

SUMMARY OF THE INVENTION

It is therefore an object of the present invention to provide a drive apparatus for ultrasonic motors which drives the ultrasonic motor again without fail as long as a normal voltage supply to the motor restores even when the voltage to the motor falls temporarily.

According to the present invention, a rotation condition of a motor such as an ultrasonic motor and an electric power such as a battery voltage are detected. A supply of the electric power to the motor is stopped under at least one of conditions that the detected rotation condition differs from a predetermined rotation condition and that the detected power differs from a predetermined power. The supply of the electric power to the motor is restored when the detected power restores the predetermined power and a drive signal for the another device is detected under a condition that the supply of the electric power to the motor is stopped. Thus, the motor operation can be restored automatically, even when the electric power decreases or the motor rotation speed decreases temporarily due to the concurrent power supply to the another device during the motor operation.

BRIEF DESCRIPTION OF THE DRAWINGS

Other objects, features and advantages of the present invention will become more apparent from the following detailed description made with reference to the accompanying drawings. In the drawings.

DETAILED DESCRIPTION OF THE PREFERRED EMBODIMENT

Figure 1:
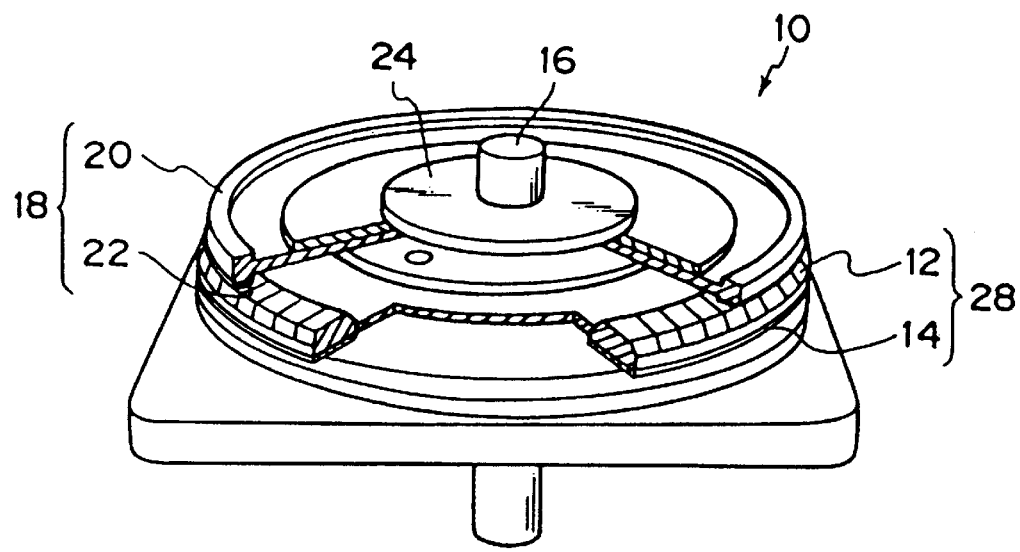
FIG. 1 is a perspective view showing, partially in section, an ultrasonic motor used in an embodiment of the present invention.

Referring first to FIG. 1, a progressive wave-type ultrasonic motor is shown with reference numeral 10. The ultrasonic motor 10 has an annular elastic body 12 made of copper alloy or the like and a piezoelectric body 14 attached to the elastic body 12. The elastic body 12 and the piezoelectric body 14 thus form a stator 28. The piezoelectric body 14 is made of a piezoelectric material which converts an electrical signal to a mechanical signal, and divided into a plurality of segments by a plurality of electrodes.

The ultrasonic motor 10 also has a drive shaft 16 and a rotor 18 fixed to the shaft 16. The rotor 18 is comprised of a rotor ring 20 made of aluminum alloy or the like and an annular slider 22 attached to the rotor ring 20. The slider 22 is pressured to contact the elastic body 12 by a spring 24. The slider 22 is made of engineering plastics or the like to provide a uniform friction force so that the rotor 18 may be rotated in high efficiencies.

Figure 2:
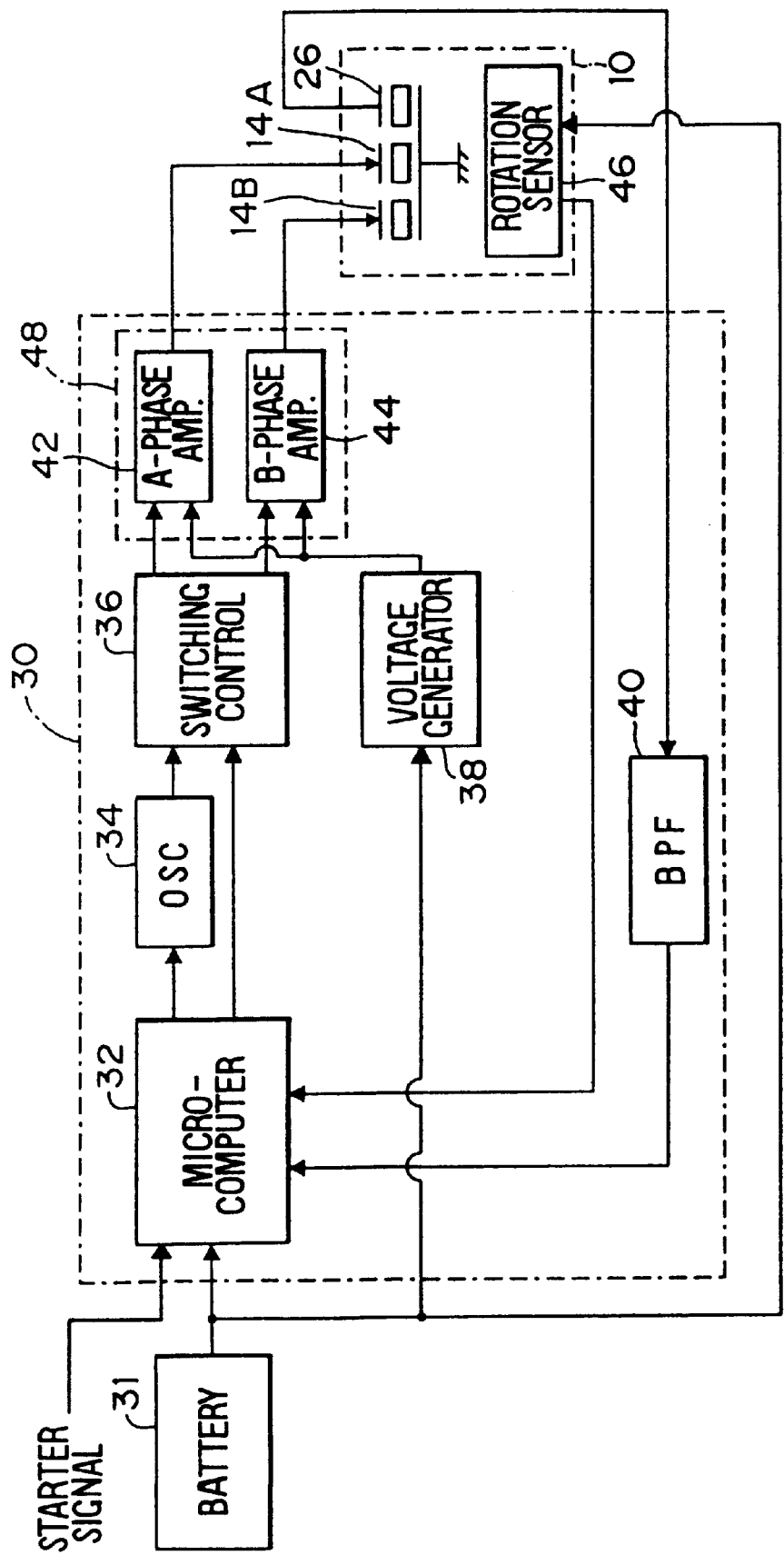
FIG. 2 is a block diagram showing an ultrasonic motor drive apparatus according to the embodiment.

The elastic body 12 is attached with a piezoelectric device 26 as shown in FIG. 2. The piezoelectric device 26 is grounded at one end and connected to the input terminal of a band pass filter 40 of a drive apparatus 30. The piezoelectric device 26 detects vibrations of the elastic body 12 and produces an a.c. signal (vibration feedback signal) which varies its amplitude and frequency with the detected vibrations. The output terminal of the band pass filter 40 is connected to one input terminal of a microcomputer 32. The band pass filter 40 wave-detects the vibration feedback signal produced from the piezoelectric device 26 to apply the same to the microcomputer 32.

The ultrasonic motor 10 has a rotation sensor 46, the output terminal of which is connected to the other input terminal of the microcomputer 32. The rotation sensor 46 is connected to a d.c. power source (battery) 31. The rotation sensor 46 is comprised of a permanent magnet, a Hall device and the like, so that the Hall device detects changes in the magnetic flux passing through the surface of the magnet. The rotation sensor 46 thus applies to the microcomputer 32 a pulse signal which varies its period in accordance with the rotation speed of the rotor 18 during rotation of the rotor 18. The microcomputer 32 calculates the rotation speed of the ultrasonic motor 10 in response to the pulse signal.

The microcomputer 32 is connected to the battery 31 to monitor a battery output voltage. A starter drive signal is applied to the microcomputer 32. The starter drive signal has a high level while a starter (not shown) is driven to drive a vehicle engine.

The output terminals of the microcomputer 32 are connected to an oscillator circuit 34 and one input terminal of a switching control circuit 36. The oscillator circuit 34 produces an oscillation signal which varies with a drive frequency signal from the microcomputer 32. The output terminal of the oscillator circuit 34 is connected to the other input terminal of the switching control circuit 36.

The switching control circuit 36 is connected to an A-phase amplifier circuit 42 and a B-phase amplifier circuit 44 which jointly constitute a drive signal generator circuit 48. The switching control circuit 36 produces to the amplifier circuits 42 and 44 drive pulses which change at the frequency of the oscillation signal produced from the oscillator circuit 34.

The voltage generator circuit 38 is connected to the A-phase amplifier circuit 42 and the B-phase amplifier circuit 44. The voltage generator circuit 38 converts the d.c. voltage supplied from the battery 31 to a boosted a.c. voltage and produces a boosted d.c. voltage through rectifying and smoothing operation. The boosted d.c. voltage is applied to the amplifier circuits 42 and 44.

Figure 3:
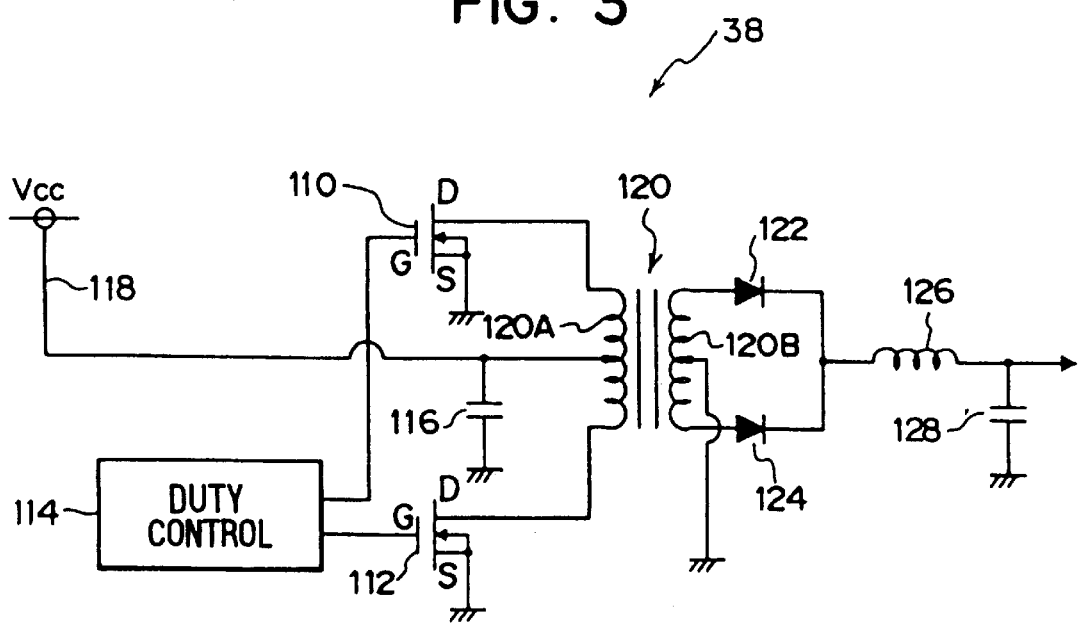
FIG. 3 is an electrical wiring diagram showing a voltage generator circuit used in the embodiment.

The voltage generator circuit 38 has, as shown in FIG. 3, a transformer 120 having a primary coil 120A and a secondary coil 120B. The mid-point of the primary coil 120A is connected to the battery 31 (Vcc in FIG. 3) through a power supply wire 118. A capacitor 116 is connected between the power supply wire 118 and the ground.

The primary coil 120A of the transformer 120 is connected to the drain D of a MOSFET (switching device) 110 at its one end. The gate G of the MOSFET 110 is connected to one output terminal of a duty control circuit 114, and the source S of the MOSFET 110 is grounded. Similarly, the primary coil 120A is connected to the drain D of a MOSFET (switching device) 112 at its other end. The gate G of the MOSFET 112 is connected to the other output terminal of the duty control circuit 114, and the source S of the MOSFET 112 is grounded.

The secondary coil 120B of the transformer 120 is connected to the anode of a diode 122 at its one end and to the anode of a diode 124 at its other end. The mid-point of the secondary coil 120B is grounded. The cathodes of the diodes 122 and 124 are connected to one end of a coil (inductor) 126. The other end of the coil 126 is connected to a capacitor 128 which is grounded. Thus, the boosted d.c. voltage developing across the capacitor 128 is applied to the A-phase amplifier circuit 42 and the B-phase amplifier circuit 44.

Figure 4:
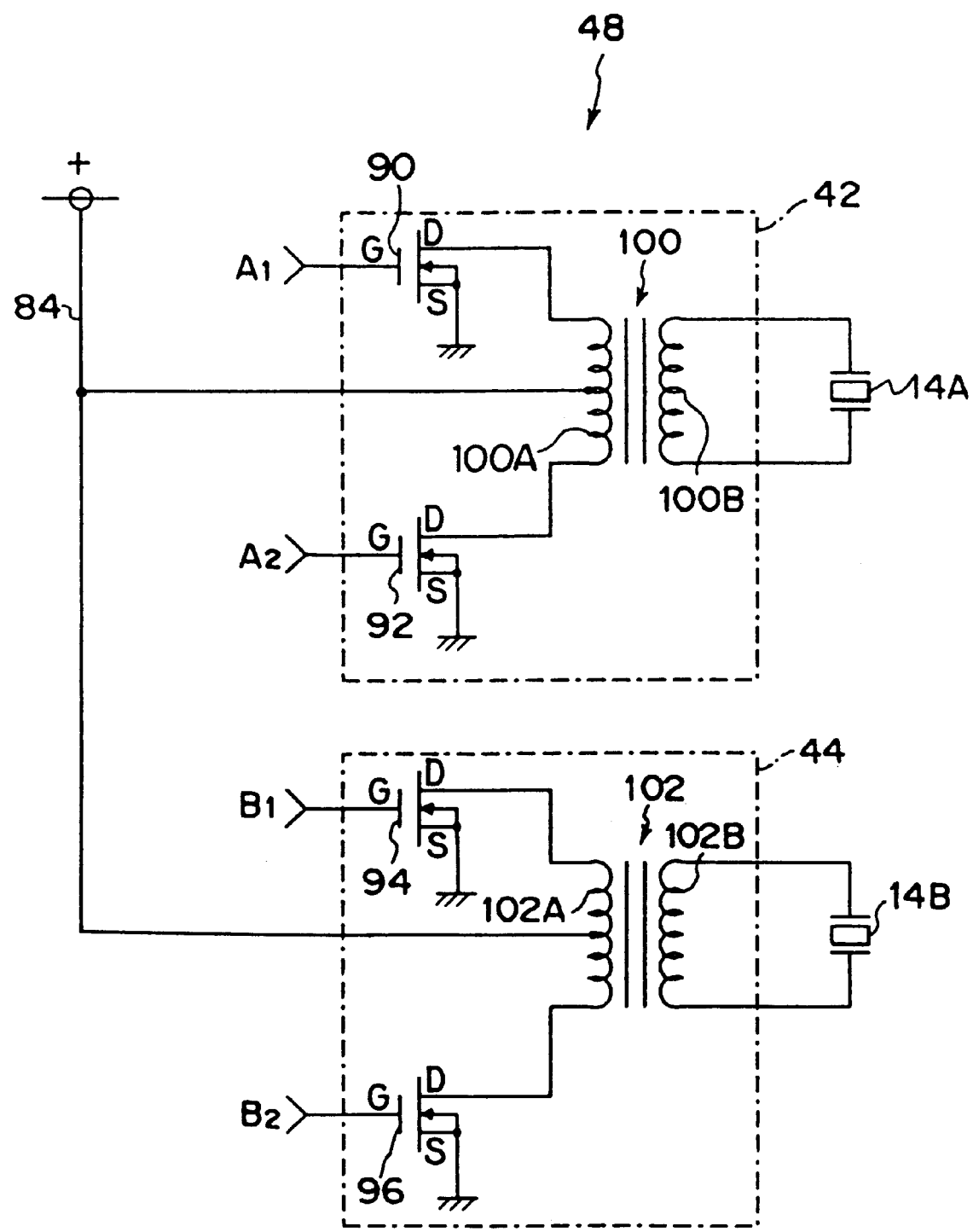
FIG. 4 is an electrical wiring diagram showing a drive signal generator circuit used in the embodiment.

As shown in FIGS. 1 and 4, the A-phase amplifier circuit 42 is connected to a piezoelectric body 14A of the ultrasonic motor 10 to supply the same with a sine wave voltage. The B-phase amplifier circuit 44 is connected to a piezoelectric body 14b of the ultrasonic motor 10 to supply the same with a cosine wave voltage. The two bodies 14A and 14B jointly constitute the piezoelectric body 14. The amplifier circuits 42 and 44 are constructed as shown in FIG. 4.

The A-phase amplifier circuit 42 includes a transformer 100 having a primary coil 100A and a secondary coil 100B. The mid-point of the primary coil 100A is connected to the output terminal of the voltage generator circuit 38 through a power supply wire 84 to receive the boosted d.c. voltage. The primary coil 10A is connected at its one end to the drain D of a MOSFET 90, and at its other end to the drain D of a MOSFET 92. The sources S of the MOSFETs 90 and 92 are grounded. The secondary coil 100B is connected to the piezoelectric body 14A.

The B-phase amplifier circuit 44 includes a transformer 102 having a primary coil 102A and a secondary coil 102B. The mid-point of the primary coil 102A is connected to the output terminal of the voltage generator circuit 38 through the power supply wire 84 to receive the boosted d.c.voltage. The primary coil 102A is connected at its one end to the drain D of a MOSFET 94, and at its other end to the drain D of a MOSFET 96. The sources S of the MOSFETs 94 and 96 are grounded. The secondary coil 102B is connected to the piezoelectric body 14B.

The gates G of the MOSFETs 90, 92, 94 and 96 are connected to the switching control circuit 36 so that the MOSFETs 90, 92, 94 and 96 are turned on and off in response to switching signals A1, A2, B1 and B2 applied from the switching control circuit 36, respectively.

The drive apparatus 30 for the ultrasonic motor 10 operates as follows.

First, the microcomputer 32 produces a drive frequency signal to the oscillator circuit 34 which in turn oscillates at a frequency determined by the microcomputer 32. The voltage generator circuit 38 receives the battery voltage Vcc from the battery 38. The duty control circuit 114 produces the switching signals to the gates G of the MOSFETs 110 and 112 at predetermined timings. As the current to the primary coil 120A of the transformer 120 is alternately turned on and off, the secondary coil 120 responsively generates an a.c. voltage (for instance, 200 Vrms). This a.c. voltage is full-wave rectified by the diodes 122 and 124 and smoothed by the coil 126 and the capacitor 128. The resulting d.c. voltage is supplied to the A-phase amplifier circuit 42 and the B-phase amplifier circuit 44.

Figure 5:
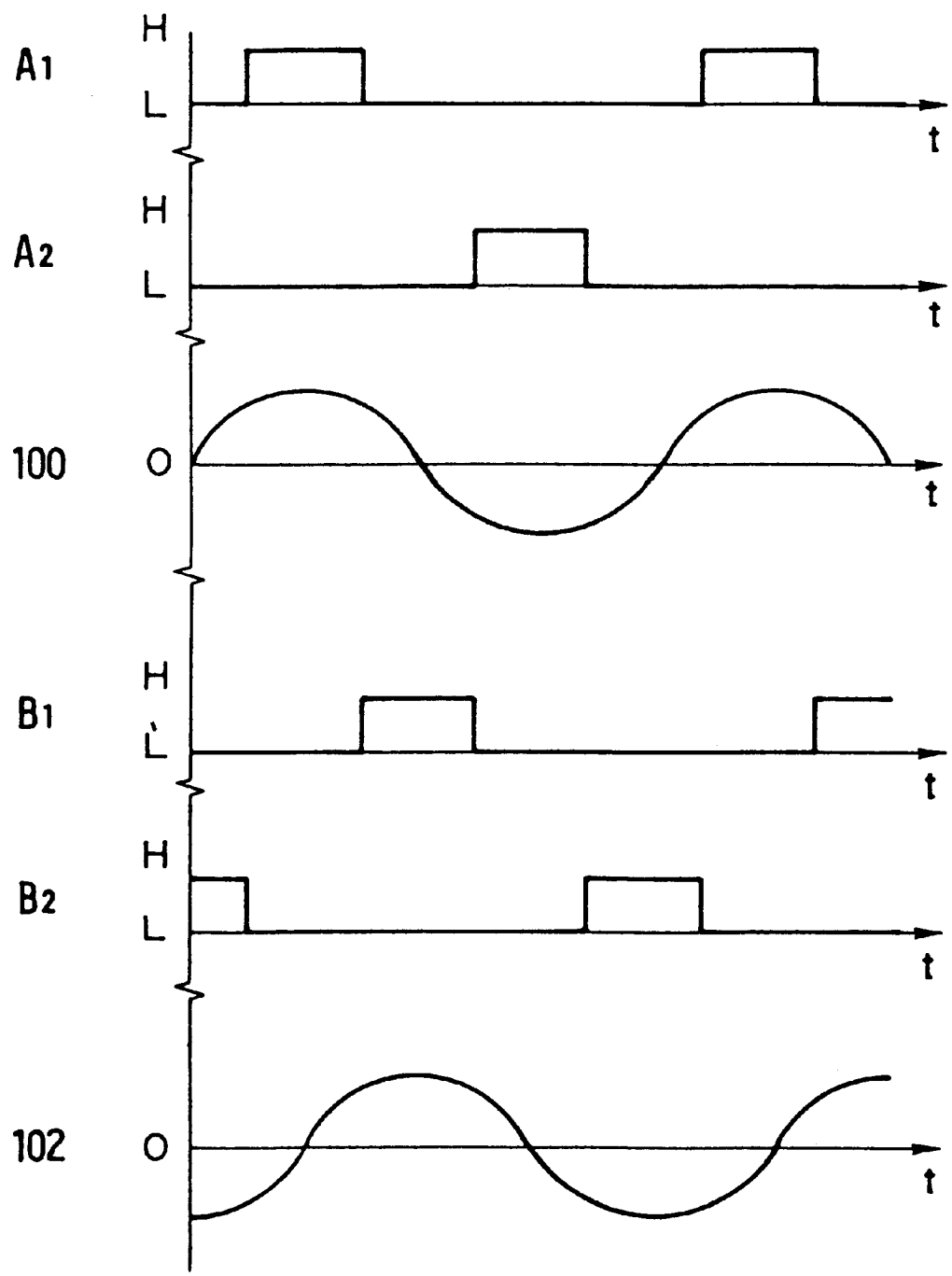
FIG. 5 is a timing diagram showing a switching signal and a drive signal developing from a switching circuit and a transformer used in the embodiment.

The switching control circuit 36 applies the switching signals A1, A2, B1 and B4 to the MOSFETs 90, 92, 94 and 96 in the amplifier circuits 42 and 44 as shown in FIG. 5. Specifically, only one of the switching signals is changed to the high level H to turn on the corresponding MOSFET while the other switching signals are maintained at the low level L. Each switching signal is changed to the high level for a one-fourth period of the frequency Fs of the drive signal. Thus, the MOSFETs 90, 92, 94 and 96 are turned on in sequence at the frequency determined by the microcomputer 32. As a result, the currents to the primary coils 10 A and 102A are supplied alternately, and the secondary coils 100B and 102B responsively generates the a.c. voltages as shown in FIG. 5. These a.c. voltages are the same in frequency but different in phase by 90°.

When the a.c. drive voltages are applied to the piezoelectric bodies 14A and 14B of the ultrasonic motor 10, the progressive wave is generated in the elastic body 12 to rotate the rotor 18. The vibrations of the elastic body 12 are converted into the electrical signal by the piezoelectric device 26 and applied to the microcomputer 32 as the feedback signal through the band pass filter 40. The rotation pulse signals produced from the rotation sensor 46 are also applied to the microcomputer 32. The microcomputer 32 responsively controls the timings of turning on and off the MOSFETs 90, 92, 94 and 9 6 while monitoring the feedback signal so that the motor drive frequency is maintained at an optimum drive frequency.

Figure 6:
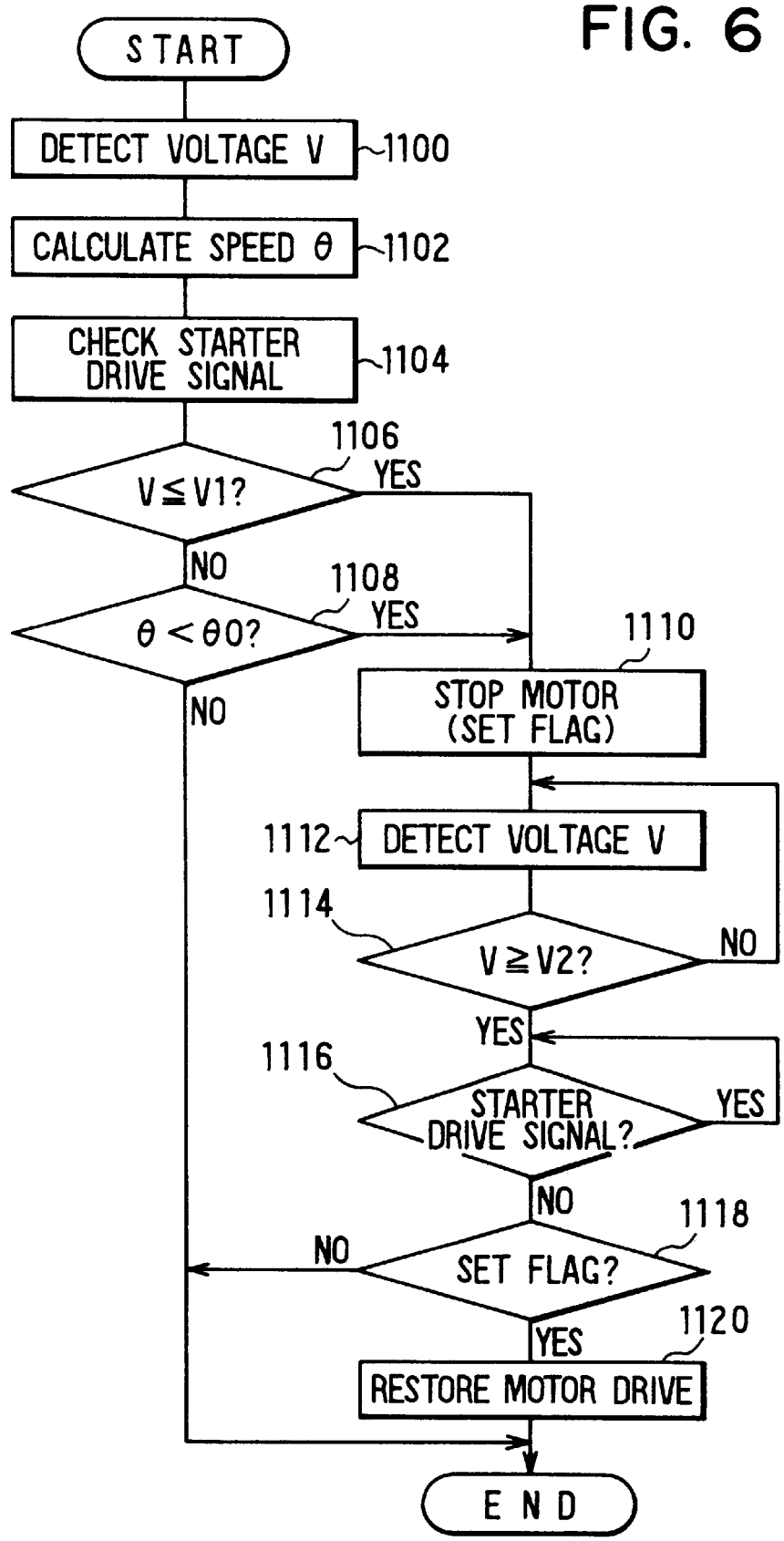
FIG. 6 is a flow diagram showing a motor drive control program of a microcomputer used in the embodiment.

The microcomputer 32 is programmed as shown in FIG. 6 to stop the ultrasonic motor 10 when abnormality occurs and restore the motor operation automatically when the abnormality is considered to have occurred due to a temporary decrease in a battery voltage.

The microcomputer 32 detects the voltage V of the battery 31 at step 1100, and calculates a motor rotation speed θ at step 1102. It then checks at step 1104 whether the starter drive signal is received. When the starter drive signal indicative of a starter motor operation is applied, a flag indicative of the starter operation is set in an internal memory.

The microcomputer 32 checks at step 1106 whether the battery voltage V is below a predetermined level V1 (for instance, 9 V), and at step 1108 whether the rotation speed θ is below a predetermined speed θ0. If either check result is YES indicating an occurrence of abnormality, the battery voltage supply to the motor 10 is stopped at step 1110.

Figure 7:
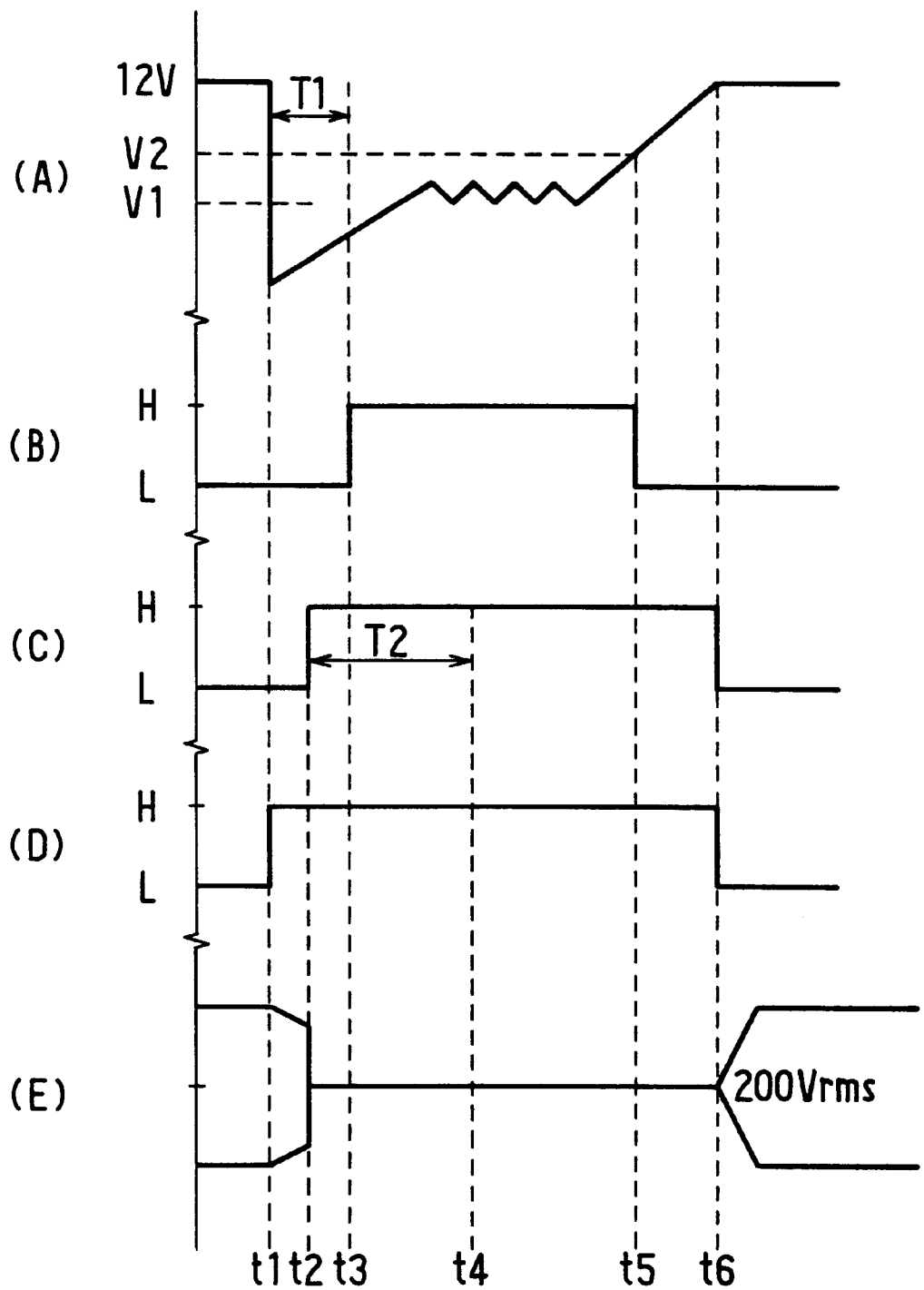
FIG. 7 is a timing diagram showing an operation of the motor drive apparatus of the embodiment.

In FIG. 7, it is assumed that the starter drive signal (D) becomes high to indicate the starter operation for engine cranking at time t1, and the battery voltage V responsively decreases to be less than the predetermined level V1 as shown by (A). The voltage supplied to the ultrasonic motor 10 decreases and the motor rotation speed decreases. When the rotation speed decreases below the predetermined speed θ0 at time t2, the microcomputer 32 determines that the abnormal condition (motor lock, etc.) has occurred at time t2 as shown by (C). It is further assumed that this voltage decrease is detected at time t3 which is after a delay period T1 from time t1. In this instance (YES at step 1108), the microcomputer 32 stops the voltage supply to the ultrasonic motor 10 at step 1110 as shown by (E). Specifically, the ultrasonic motor 10 is stopped by disabling the oscillation of the oscillator circuit 34.

That is, the microcomputer 32 checks whether the starter drive signal is high during a time period T2(for instance, 1 second) from time t2 to time t4. If the starter drive signal is applied as shown by (D), the microcomputer 32 sets a flag indicative thereof in its memory.

The microcomputer 32 further detects the battery voltage V at step 1112, and checks at step 1114 whether the voltage V is equal to or more than a predetermined level V2 (for instance, 10 V). If the voltage V restores at time t5 as shown by (A), the microcomputer 32 checks at step 1116 whether the starter drive signal is applied, that is, whether the starter drive is completed.

If the starter drive signal disappears at time t6 (NO at step 1116), the microcomputer 32 checks at step 1118 whether the flag has been set, that is, whether the starter was driven within the time period T2after the detection of lock condition (time t2). The microcomputer 32 cancels the motor stop at step 1120 to drive the motor 10 again, if the starter drive signal was applied during the time period T2 (YES at step 1118).

According to the embodiment, as described above, the stop of the motor 10 is not maintained but cancelled so that the motor 10 is driven again, even when the motor lock is detected before the detection of battery voltage decrease. The motor operation is thus restored, when it is estimated that the abnormality occurred due to the temporary decrease of the battery voltage caused by the concurrent power supply to the starter motor during the ultrasonic motor operation. Thus, the motor stop cancellation is effected, only when the starter drive signal is applied during the time period T2, that is, only when it is clear that there exists no abnormal condition.

Figure 8:
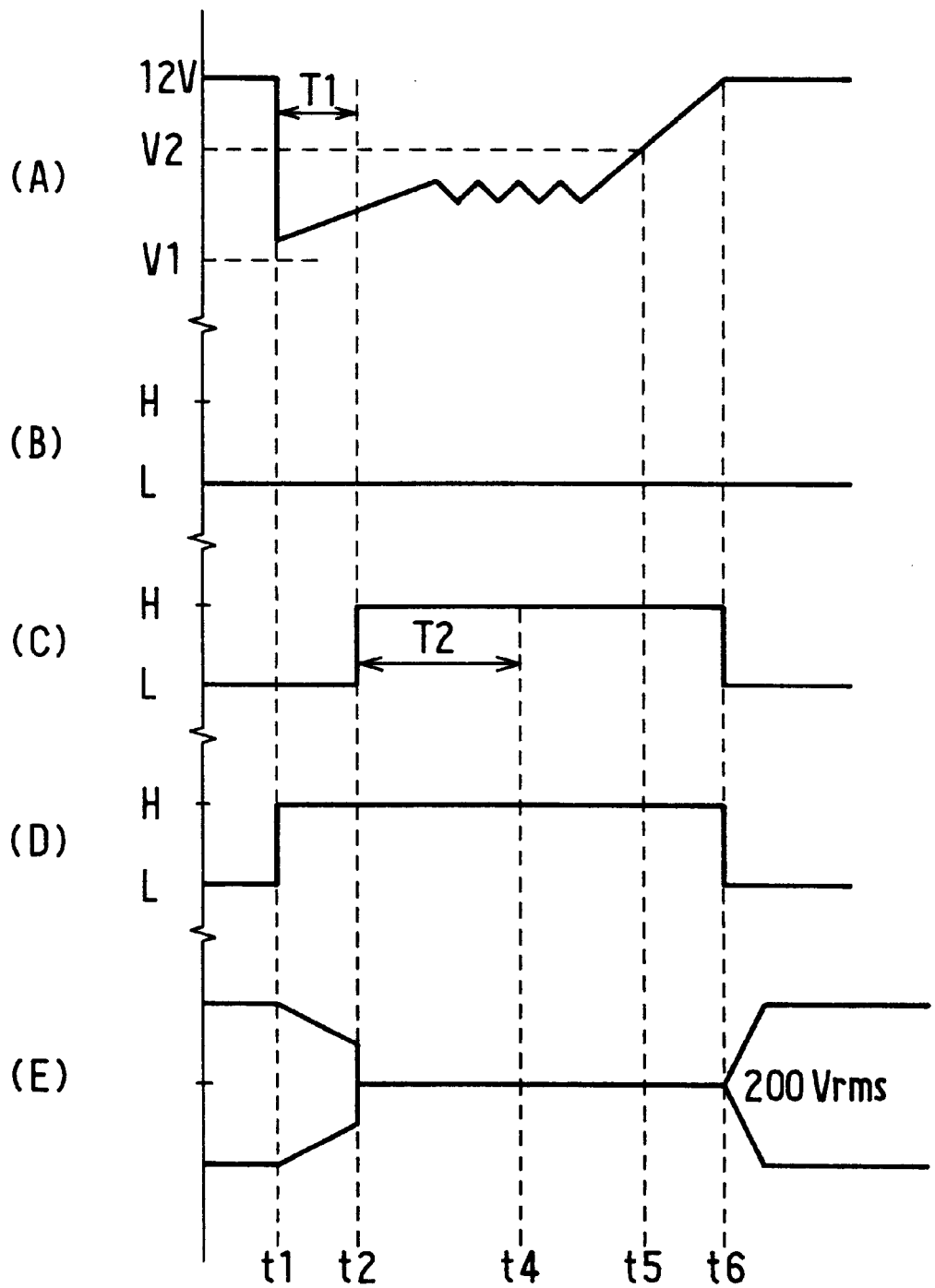
FIG. 8 is a timing diagram showing another operation of the motor drive apparatus according to the embodiment.
Figure 9:
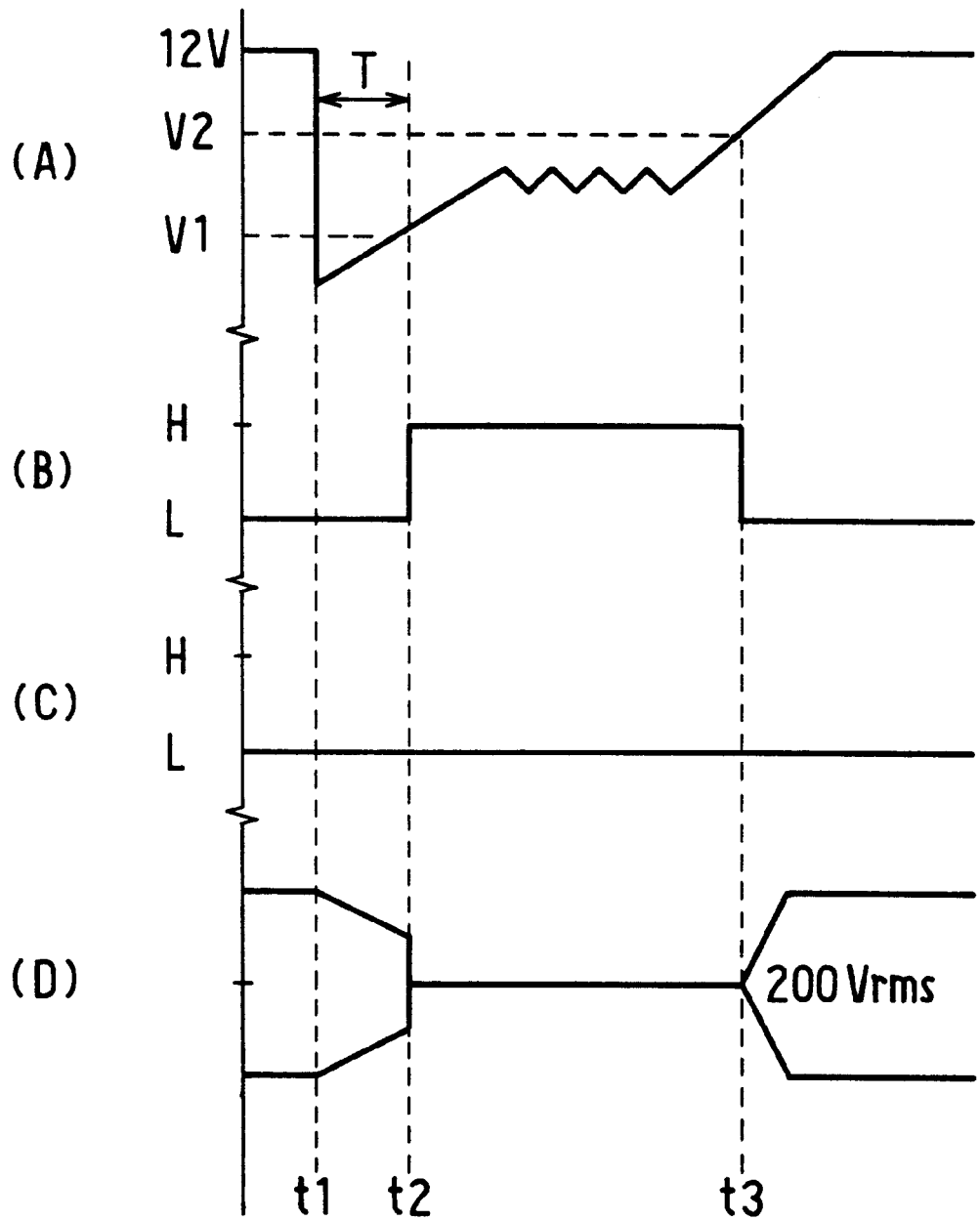
FIG. 9 is a timing diagram showing an operation of a conventional apparatus.
Figure 10:
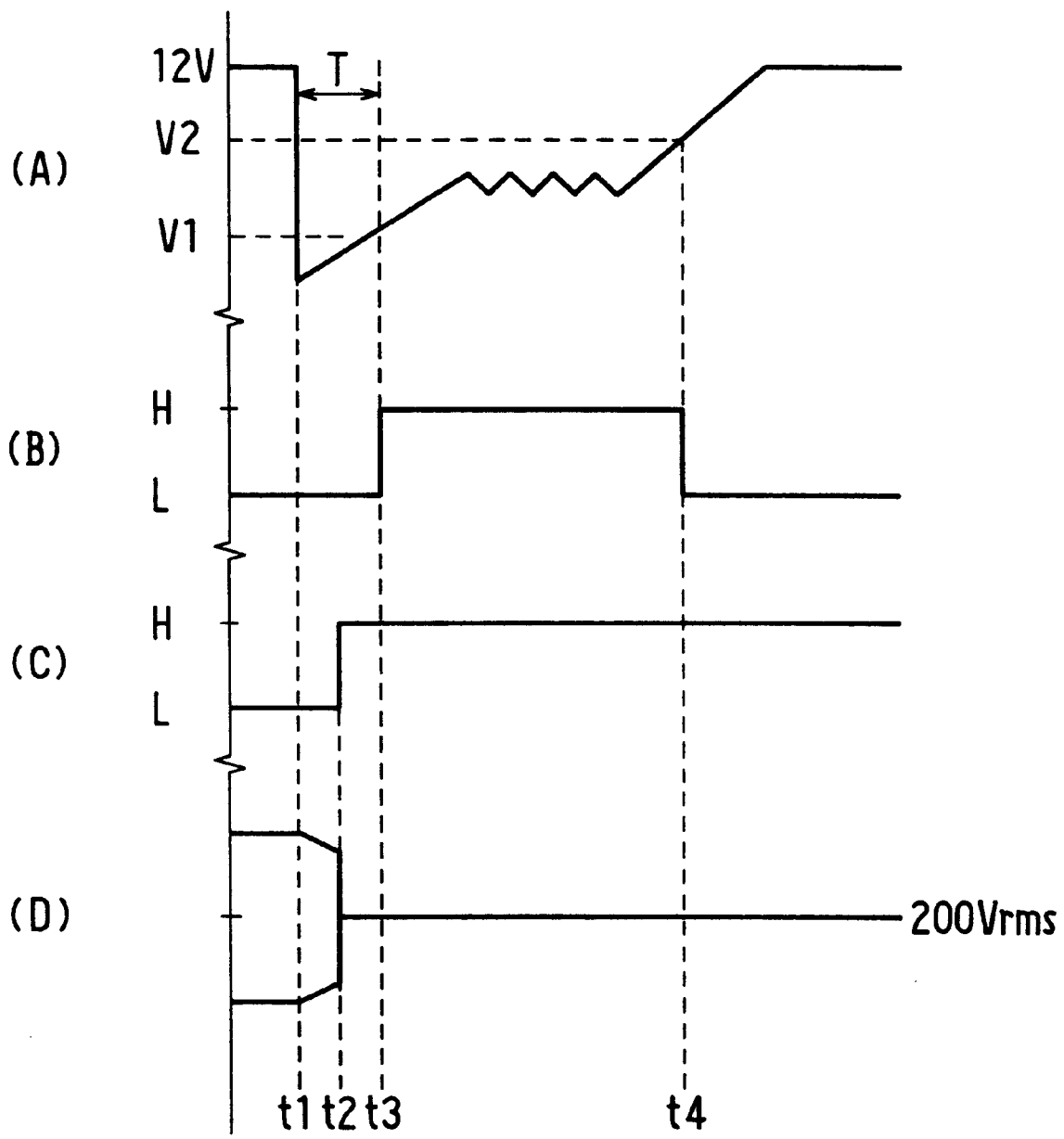
FIG. 10 is a timing diagram showing another operation of the conventional apparatus.

In FIG. 8, it is assumed that the battery voltage V does not decrease below the predetermined level V1 as shown by (A), and the lock is detected at time t2 as shown by (C). The starter drive signal is high during the period T2 from the lock detection at time t2 to time t4 as shown by (D). In this instance also, as shown by (E), the ultrasonic motor 10 is driven again at time t6, if the battery voltage V increases above the predetermined level V2 at time t5 and the starter drive signal becomes low at time t5 as shown by (D).

The present invention should not be limited to the disclosed embodiment but may be implemented or applied differently. For instance, the present invention may be applied to other motors such as d.c. motors.

What is claimed is:

1. A motor drive apparatus comprising:

a motor driven electrically;

rotation detection means for detecting a rotation condition of the motor;

power detection means for detecting an electric power supplied to the motor;

drive signal detection means for detecting a drive signal applied to another device which is driven with the electric power at the same time as the motor;

stop means for stopping a supply of the electric power to the motor under at least one of conditions that the detected rotation condition differs from a predetermined rotation condition and that the detected power differs from a predetermined power; and restoration means for restoring the supply of the electric power to the motor when the detected power restores the predetermined power and the drive signal for the another device is detected under a condition that the supply of the electric power to the motor is stopped.

2. A motor drive apparatus of claim 1, wherein the electric power to the motor is supplied from a storage battery.

3. A motor drive apparatus of claim 1, wherein the another device is a starter motor of an automotive vehicle.

4. A motor drive apparatus of claim 1, wherein the restoration means restores the supply of the electric power when the drive signal for the another device is detected within a predetermined time period from a stop of the motor.

5. A motor drive apparatus of claim 1, wherein the motor is an ultrasonic motor which includes a stator having an annular elastic body and a piezoelectric body attached to the annular elastic body to generate vibrations of the elastic body and a rotor press-contacted with the elastic body, and wherein the rotation detection means is a rotation sensor which detects a rotation speed of the rotor.

6. A motor drive apparatus of claim 5, wherein:

the electric power to the motor is supplied from a storage battery; and the another device is a starter motor of a vehicle.

7. A motor drive apparatus of claim 6, wherein the restoration means restores the supply of the electric power when the drive signal for the another device is detected within a predetermined time period from a stop of the motor.

8. A motor drive apparatus of claim 5, wherein the restoration means restores the supply of the electric power when the drive signal for the another device is detected within a predetermined time period from a stop of the motor.

9. A motor drive apparatus of claim 1, wherein the motor is an ultrasonic motor which includes a stator having an annular elastic body and a piezoelectric body attached to the annular elastic body to generate vibrations of the elastic body and a rotor press-contacted with the elastic body, and wherein the rotation detection means is a piezoelectric device attached to the elastic body to detect vibration conditions of the elastic body and generate a vibration feedback signal.

10. A motor drive apparatus of claim 9, wherein the electric power to the motor is supplied from a storage battery, and wherein the another device is a starter motor of an automotive vehicle.

11. A motor drive apparatus of claim 10, wherein the restoration means restores the supply of the electric power when the drive signal for the another device is detected within a predetermined time period from a stop of the motor.

12. A motor drive apparatus of claim 9, wherein the restoration means restores the supply of the electric power when the drive signal for the another device is detected within a predetermined time period from a stop of the motor.

13. A control method for a vehicle having a battery, an ultrasonic motor and a starter motor, the control method comprising the steps of:

detecting a rotation speed of the ultrasonic motor;

checking for an abnormality of the ultrasonic motor from the detected rotation speed;

stopping a supply of electric power from the battery to the ultrasonic motor in response to an occurrence of the abnormality;

checking for a supply of electric power from the battery to the starter motor at a time of stopping the supply of electric power to the ultrasonic motor;

checking for an increase in the electric power of the battery from a low level to a high level; and restoring automatically the supply of electric power to the ultrasonic motor in response to check results indicating the supply of electric power to the starter motor and the increase in the electric power to the high level.

14. A control method of claim 13, wherein the step of checking for the supply of electric power is limited to a predetermined time period from the occurrence of the abnormality of the ultrasonic motor.

15. A control method of claim 13, wherein the check result indicating the supply of electric power to the starter motor is stored in a memory, and is referred to when the supply of electric power to the ultrasonic motor is restored.

* * * * *